United States Patent
Wang et al.

(10) Patent No.: US 10,594,459 B2
(45) Date of Patent: Mar. 17, 2020

(54) METHOD AND APPARATUS FOR EXTRACTING LARGE-SCALE FEATURES IN PROPAGATION CHANNELS VIA NON-ORTHOGONAL PILOT SIGNAL DESIGNS

(71) Applicants: Chenwei Wang, Los Altos, CA (US); Ozgun Bursalioglu Yilmaz, Palo Alto, CA (US); Haralabos Papadopoulos, Los Altos, CA (US)

(72) Inventors: Chenwei Wang, Los Altos, CA (US); Ozgun Bursalioglu Yilmaz, Palo Alto, CA (US); Haralabos Papadopoulos, Los Altos, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/961,571

(22) Filed: Apr. 24, 2018

(65) Prior Publication Data

US 2018/0351708 A1 Dec. 6, 2018

Related U.S. Application Data

(60) Provisional application No. 62/490,380, filed on Apr. 26, 2017.

(51) Int. Cl.
*H04W 4/00* (2018.01)
*H04L 5/00* (2006.01)
(Continued)

(52) U.S. Cl.
CPC ........... *H04L 5/005* (2013.01); *H04B 7/0452* (2013.01); *H04B 7/0456* (2013.01);
(Continued)

(58) Field of Classification Search
CPC ...... H04B 7/0452; H04B 7/0456; H04B 7/06; H04B 7/0617; H04L 5/005; H04L 5/0051;
(Continued)

(56) References Cited

U.S. PATENT DOCUMENTS 8,638,746 B2 *  1/2014 Papadopoulos ........ H04B 7/024
                                                   370/328
8,724,610 B2 *  5/2014 Ashikhmin ............ H04J 11/005
                                                   370/345
(Continued)

OTHER PUBLICATIONS

Elijah et al, A Comprehensive Survey of Pilot Contamination in Massive MIMO-5G System, IEEE, 19 pages, 2016.*
(Continued)

*Primary Examiner* — Frank Duong
(74) *Attorney, Agent, or Firm* — Womble Bond Dickinson (US) LLP

(57) ABSTRACT

A method and apparatus for data transmission in a cellular system are disclosed herein In one embodiment, the method comprises receiving transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot; estimating large-scale radio-channel propagation strengths of a plurality of nearby UEs to a base station; estimating radio-propagation channel coefficients between each base-station antenna and each UE, in a subset of UEs in the plurality of nearby UEs that have large-scale radio-channel propagation strengths to the base station that are stronger than those UEs in the plurality of nearby UEs not part of the subset; and transmitting to in-cell UEs via
(Continued)

multi-user beamforming, including suppressing interference to one or more nearby out-of-cell UEs that are part of the plurality of nearby UEs.

24 Claims, 5 Drawing Sheets

(51) Int. Cl.
    *H04B 7/0456*     (2017.01)
    *H04L 25/02*     (2006.01)
    *H04B 7/06*     (2006.01)
    *H04B 7/0452*     (2017.01)
    *H04W 88/08*     (2009.01)

(52) U.S. Cl.
    CPC ......... *H04B 7/0617* (2013.01); *H04L 5/0051* (2013.01); *H04L 25/021* (2013.01); *H04L 25/0204* (2013.01); *H04L 25/0228* (2013.01); *H04L 25/0244* (2013.01); *H04L 25/0248* (2013.01); *H04L 25/0256* (2013.01); *H04L 5/0073* (2013.01); *H04W 88/085* (2013.01)

(58) Field of Classification Search
    CPC ... H04L 5/0073; H04L 25/02; H04L 25/0204; H04W 88/085
    See application file for complete search history.

(56) References Cited

U.S. PATENT DOCUMENTS

| | | | | |
|---|---|---|---|---|
| 8,995,401 | B2* | 3/2015 | Ashikhmin | H04B 7/0617 370/334 |
| 9,455,816 | B2* | 9/2016 | Ashikhmin | H04L 5/0032 |
| 9,559,759 | B2* | 1/2017 | Taherzadeh Boroujeni | H04B 7/0417 |
| 9,647,734 | B2* | 5/2017 | Liu | H04B 7/0452 |
| 10,063,396 | B2* | 8/2018 | Luo | H04L 25/0256 |

OTHER PUBLICATIONS

Caire et al, RRH based Massive MIMO with "on the Fly" Pilot Contamination Control, arXiv, 7 pages, Jan. 2016.*
Zerlin et al, Covariance-Based Linear Precoding, IEEE, Jan. 2006.*
Wang et al, On-the-fly Large-scale Channel-Gain Estimation for Massive Antenna-Array Base Stations, arXiv, 6 pages, Nov. 2018.*
W.U. Bajwa et al. "Compressed channel sensing: A new approach to estimating sparse multipath channels," IEEE vol. 98, No. 6 pp. 1058-1076, Jun. 2010, 17 pages.
David Tse, et al. "Fundamentals of Wireless Communication," Cambridge University Press, 2005, 31 pages.
D. Bethanabhotla et al. "Optimal user-cell association for massive MIMO wireless networks," Cornell University, Jul. 24, 2014, 40 pages.
G. Dimic et al., "On Downlink Beamforming With Greedy User Selection: Performance Analysis and a Simple New Algorithm," IEEE Trans. on Sig. Proc., vol. 53, No. 10, Oct. 2005.
L. Georgiadis et al., "Resource Allocation and cross-layer control in wireless networks," Found. Trends in Networking, vol. 1, No. 1, 2006.
G. Caire, N. Jindal, M. Kobayashi, and N. Ravindran, "Multiuser MIMO achievable rates with downlink training and channel state feedback," IEEE Trans. on Inform. Theory, vol. 56, No. 6, pp. 2845-2866, 2010.
T. L. Marzetta, "Noncooperative cellular wireless with unlimited numbers of base station antennas," IEEE Transactions on Wireless Communications, vol. 9, pp. 3590-3600, Nov. 2010.
H. Huh, A. Tulino, and G. Caire, "Network MIMO with linear zero-forcing beamforming: large system analysis, impact of channel estimation and reduced complexity scheduling," IEEE Trans. on Info. Theory, pp. 2911-2934, May 2012.
H. Huh, G. Caire, H. C. Papadopoulos, and S. A. Ramprashad, "Achieving massive MIMO spectral efficiency with a not-so-large number of antennas," IEEE Trans. on Wireless Communications, pp. 3226-3239, Sep. 2012.
J. Hoydis, S. Ten Brink, and M. Debbah "Massive MIMO in the UL/Dl of cellular networks: How many antennas do we need?," IEEE Journal on Sel. Areas in Communications, vol. 31, pp. 160-171, Feb. 2013.
X. Mestre, "An introduction to G-estimation with sample covariance matrices," presented at Matrices aleatoires: applications aux communications numeriques et al estimation statistique, ENST (Telecom Paris), Jan. 10, 2007.—See more at: http://<,vww .cHc. es/peoplei x1nestre/#sthash. FSqxTFUR_.dpnf.
W. C. Ao, C. Wang, 0. Y. Bursalioglu, and H. Papadopoulos, "Compressed Sensingbased Pilot Assignment and Reuse for Mobile UEs in mm Wave Cellular Systems," Proc. of 2016 IEEE ICC, Kuala Lumpur, Malaysia, May 2016.

* cited by examiner

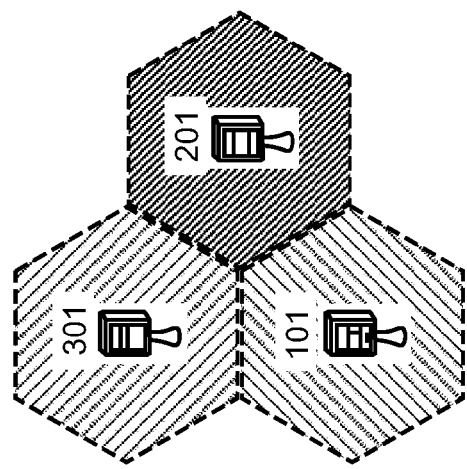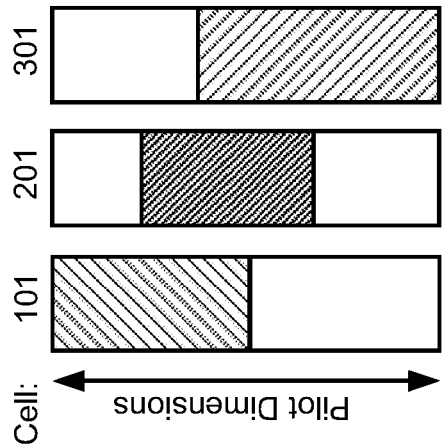
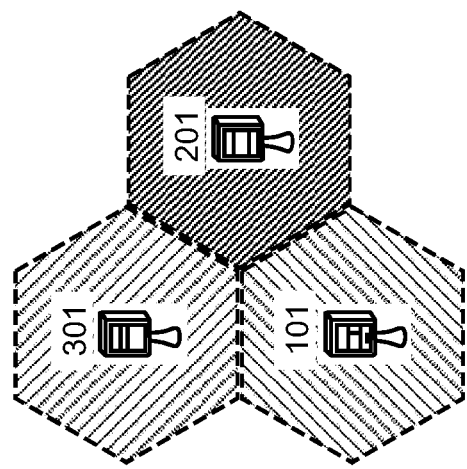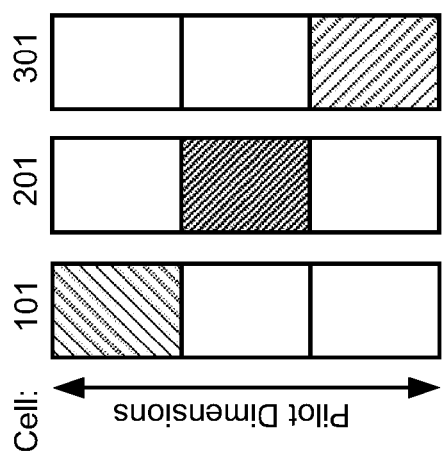
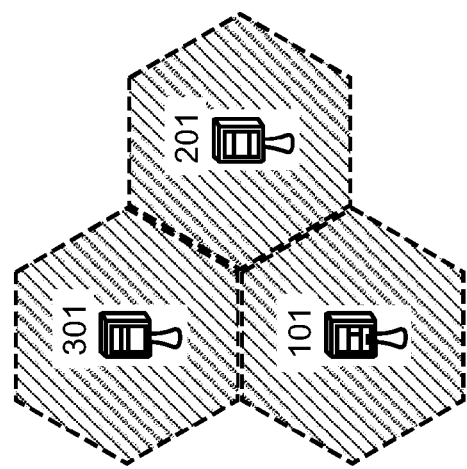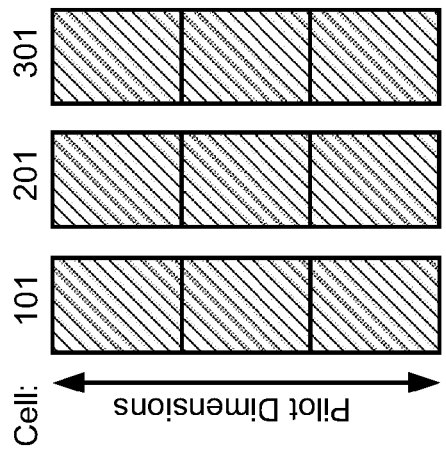
FIG. 1A  FIG. 1B  FIG. 1C

| | UE 1 | UE 2 | UE 3 | UE 4 |
|---|---|---|---|---|
| t=1 | 1 | 1 | 0 | 0 |
| t=2 | 0 | 1 | 1 | 0 |
| t=3 | 1 | 0 | 0 | 1 |
| t=4 | 0 | 1 | 0 | 1 |
| t=5 | 1 | 0 | 1 | 0 |
| t=6 | 0 | 0 | 1 | 1 |
| Access probability | 1/2 | 1/2 | 1/2 | 1/2 |

METHOD AND APPARATUS FOR EXTRACTING LARGE-SCALE FEATURES IN PROPAGATION CHANNELS VIA NON-ORTHOGONAL PILOT SIGNAL DESIGNS

PRIORITY

The present patent application claims priority to and incorporates by reference the corresponding provisional patent application Ser. No. 62/490,380, titled, "Method and Apparatus for Extracting Large-scale Features in Propagation Channels via Non-orthogonal Pilot Signal Designs," filed on Apr. 26, 2017.

FIELD OF THE INVENTION

Embodiments of the present invention relate to the field of wireless communication; more particularly, embodiments of the present invention relate to non-orthogonal pilot training and interference suppression to out-of-cell nearby user terminals based on assigned pilot codes.

BACKGROUND

Dense cellular network deployments relying on the use of massive MIMO technologies are becoming very attractive candidates for emerging and future radio access technologies. This is partly due to the promise of massive MIMO for providing very large throughput increases per base station, due to its ability to harvest large gains in "signal to interference plus noise ratio" (SINR) via "beamforming", and its ability to multiplex a large number of high-rate streams over each transmission resource element. It is well accepted by now that major gains in the PHY layer in terms of throughput per unit area are to come from the judicious use of dense infrastructure antenna deployments, comprising of a dense network of small cells, possibly equipped with large antenna arrays. Indeed, massive MIMO is very attractive when it is used over dense (small cell) deployments, as in principle it can translate to massive throughput increases per unit area with respect to existing deployments.

Massive MIMO is also envisioned as a candidate for addressing large variations in user load, including effectively serving user-traffic hotspots, such as malls or overcrowded squares. A deployment option that is considered attractive especially for serving user-traffic hotspots involves remote radio-head (RRH) systems in which a base station controls a massive set of antennas that are distributed over many locations. Current proposals for RRH systems consider only one or a few antennas per RRH site. However, with bandwidth expected to become available at higher frequency bands (including the mmWave band), it will become possible to space antenna elements far closer to one another and consider RRHs with a large number of antennas per RRH site. In principle, this would allow the network to simultaneously harvest densification and large-antenna array benefits, thereby delivering large spectral efficiencies per unit area.

Channel state information (CSI) between each base station antenna and the user terminals (UTs) is required to serve multiple streams over the same transmission resources. CSI is obtained by from use of training pilots. A pilot transmitted by one antenna and received by another allows learning the CSI between the two antennas. With massive arrays at the base station side, the preferred option for training, in terms of its training overheads, is to train in the uplink, as one pilot from a user antenna trains all the antennas at nearby base station sites, no matter how many sites and antennas per site. In addition, this immediately makes the user-base station antenna channels available at the base station sites. Note that the channel estimates that become available in this manner at the base station sites can be used for decoding data transmitted in the uplink, and they can also be used to enable multiplexing and beamforming gains for downlink transmission. Indeed, by using UL training and exploiting the uplink-downlink radio channel reciprocity, "Massive MIMO" rates can be achieved in the DL, provided UL training and DL massive MIMO data transmission are within the coherence time and bandwidth of the wireless propagation channel.

Reciprocity-based training can also inherently enable coordinated multipoint (CoMP) transmission, including RRH based transmission. Indeed, a single pilot broadcast from a user antenna trains all the antennas at all nearby base station sites that it can be received at sufficiently high power. It is well known that in cellular networks such CoMP transmission is beneficial for users at the cell edge, i.e., for users that receive equally strong signals from more than one base station. Similar performance gains are expected in RRH systems. Inherently, a user can obtain beamforming gains during the data transmission phase from all the RRH site-antenna combinations that receive the user's pilot broadcast at sufficiently high power.

An important challenge that arises in harvesting densification benefits with cellular networks arises from the fact that UL pilot resources must be reused over the network. It is desirable to make the reuse distance of a pilot resource as small as possible to maximize the densification benefits and the delivered network spectral efficiency and throughput per unit area. Indeed, if the same pilot resource could be effectively reused by two close-by users, then these two close-by users can be served in parallel by the network. However, the users would have to be significantly geographically separated, so that their simultaneously broadcasted pilots are received by their serving base stations at sufficiently high powers and by the other user's base stations at sufficiently low powers. This implies that there is a minimum reuse distance for a users' UL pilot that has to be honored so that users using the same pilot have to be significantly separated to not cause interference to each of the other base stations.

To achieve large cell throughputs and (especially) cell-edge throughputs over well-planned macro-cellular networks with the simplified scheduling and precoding operation, a reuse-7 operation may be used. It is easy to show that in such a massive MIMO network the advocated operation is effectively equivalent to a reuse-1 operation with pilot-reuse 7, whereby the pilots are split into 7 subsets and each subset is reused every 7-th cell.

A pilot reuse extension of this approach over heterogeneous networks having well-planned macro-cells and small cells exists. In particular, pilot dimensions are split between macros and small cells. Furthermore, the individual tier pilot resources are reused with a given pilot reuse factor. For example, the small cell base stations are colored with a finite set of colors, so that no small cell has a same-color neighbor. The pilot reuse factor in this case corresponds to the number of used colors. Although in theory this results in a minimum pilot-reuse of 4 as the minimum number of needed colors is 4, in practice larger number of colors (and thus larger pilot reuse factors to reduce the interference level) are required.

A geographic scheduling approach has been introduced, where in each scheduling slot users at similar locations (relative to their serving cell) are scheduled for transmission across the network. This allows optimizing the precoder, multiplexing gains and the pilot reuse independently per geographic location, i.e., independently for cell-center and cell-edge users. With this operation, substantial gains can be harvested with respect to macro-cellular networks in terms of both cell and cell-edge throughputs (as well as in terms of the number of antennas needed to achieve a certain level of performance). However, this geographic scheduling approach relies on a well-planned macro-cellular network with dense user traffic with geographic scheduling and optimization is possible. As a result, this approach cannot be directly used in unplanned small cell deployments.

SUMMARY OF THE INVENTION

A method and apparatus for data transmission in a cellular system are disclosed herein In one embodiment, the method comprises receiving transmissions of uplink pilot signals made in each slot, by a number of user equipments (UEs), over the radio resource elements in slots that are allocated for uplink pilot transmission, wherein the number of UEs in the vicinity of at least one base station exceeds the number of radio resource elements that have been allocated for uplink pilot transmission in the slot; estimating large-scale radio-channel propagation strengths of a plurality of nearby UEs to a base station; estimating radio-propagation channel coefficients between each base-station antenna and each UE, in a subset of UEs in the plurality of nearby UEs that have large-scale radio-channel propagation strengths to the base station that are stronger than those UEs in the plurality of nearby UEs not part of the subset; and transmitting to in-cell UEs via multi-user beamforming, including suppressing interference to one or more nearby out-of-cell UEs that are part of the plurality of nearby UEs.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 1A-C illustrate pilot dimension assignment over cells.

DETAILED DESCRIPTION OF THE PRESENT INVENTION

Figure 2:
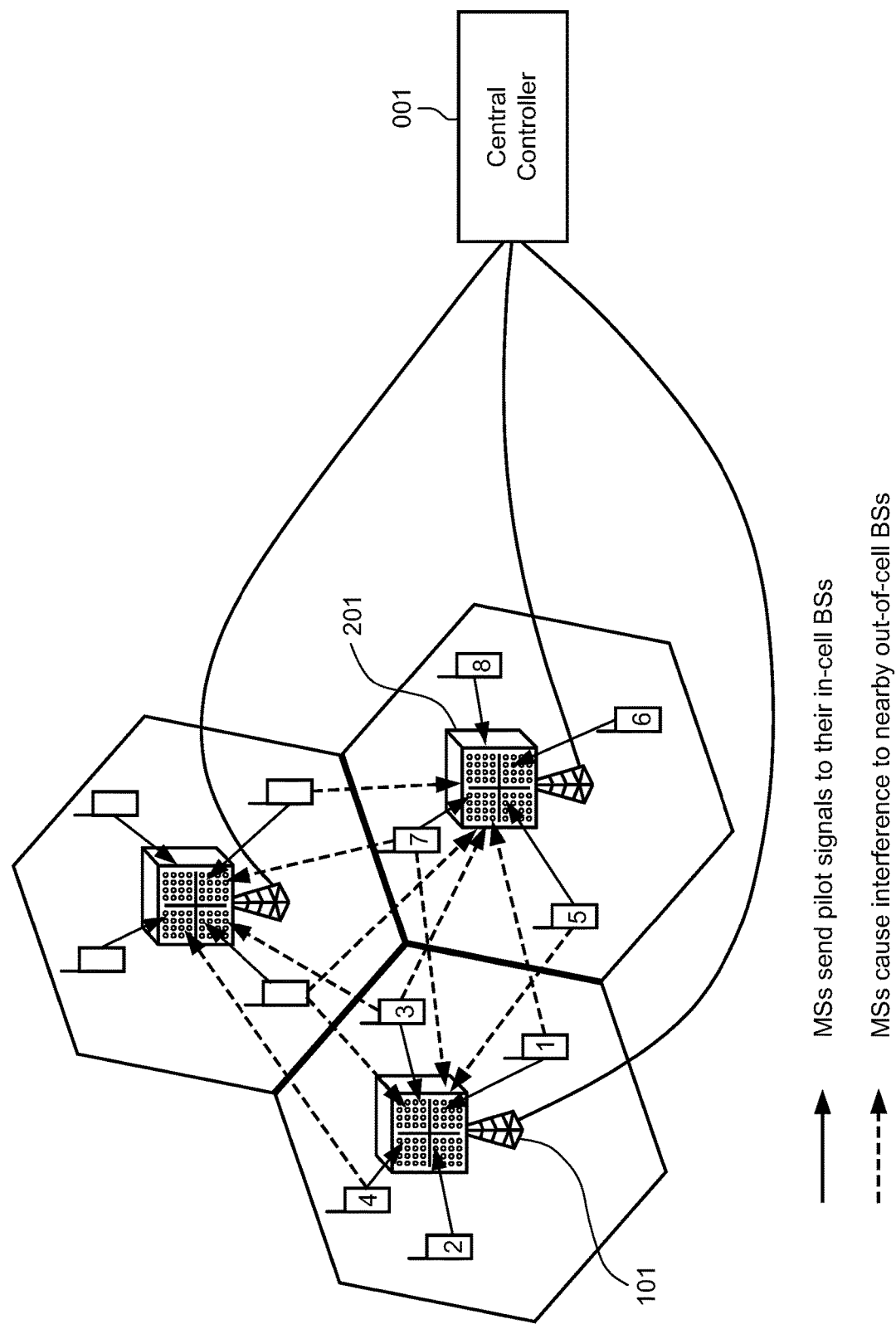
FIG. 2 illustrates base station suppression of interference of out-of-cell user terminals (users).

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Methods and apparatuses for allowing an increase of the network spectral efficiency per unit area in dense antenna/antenna-site network deployments are disclosed. In one embodiment, the techniques disclosed herein rely on the combined use of appropriately designed pilot codes for use in the uplink by active (scheduled) users in a cellular network, and of mechanisms in each cell in the network for on-the-fly estimation of the interference levels at nearby active out-of-cell users. Note that in the following disclosure, the terms "user", "user equipment," and "user terminal" are used interchangeably.

Embodiments exploit large antenna arrays at each base station which, together with appropriately designed pilot codes, allow the base station to estimate the large-scale channel gains of a very large number of nearby active out-of-cell users. This can be in turn used for a variety of purposes. In the context of time-division duplex (TDD) transmission and reciprocity-based training, they can be used at the base station for proactively reducing interference (during downlink (DL) transmission) to nearby out-of-cell users to which the base station has estimated significant large-scale channel gains. These estimates can also be used for designing precoding vectors and adjusting MCS levels, etc. Although the disclosed mechanisms are described in the context of TDD and reciprocity-based training, they can also have a much broader scope. For instance, they can be used to perform interference mitigation in the uplink (UL) (either frequency division duplex (FDD) or TDD) to adjust user-base station re-associations in the network and to update multiplexing gains locally at each base station, etc.

In one embodiment, UL signaling pilot protocols for the users and subsequent user-channel estimation methods at a base station allow the base station to estimate the large-scale gains between the base station and each user in a potentially large set of users served by nearby base stations. According to one embodiment, each base station is allocated a set of pilot codes for assignment among its users, and each base station is assumed to know the codes assigned to nearby base stations, but not the identity (and thus the relative location and received signal strengths) of the users to which nearby base stations assign these codes for UL pilot transmission in each resource block (RB). In one embodiment, the base station estimates the large-scale gains of nearby active in-cell and out-of-cell users by observing the UL pilot transmissions, where the number of (active in-cell and out-of-cell) users (of which the large-scale gains are estimated) is potentially much larger than the pilot dimensions.

The estimates of the large-scale gains of users served by nearby base stations can be used for various purposes. In one embodiment, they can be used to adapt the transmission from the base station to mitigate the interference caused by that base station to a subset of nearby users that experience sufficiently high signal strength from that base station. In one embodiment, the large-scale gain estimates of out-of-cell users can be used for collecting statistics regarding the fraction and identities of out-of-cell users that are strongly interfered by a base station. In one embodiment, these statistics are used for re-association of users to base stations and/or for adapting the multiplexing gains (number of streams served per RB) at each base station. In another embodiment, the large-scale gain estimates of all nearby users close to a base station can also be used for random access of users to a nearby base station.

Massive MIMO arrays at the base stations of a cellular network can substantially simplify scheduler operations. In sharp contrast to conventional MIMO, in massive MIMO, the rate provided to an active (scheduled) user by its serving base station does not depend on the channels of the other active users in the same cell and in all nearby cells and can be in fact predicted a priori. Such type of operation has been exploited over macro-cellular massive MIMO deployments to obtain large cell and cell-edge throughput gains with respect to their conventional MIMO counterparts. This rate-hardening approach has been extended to include operation over heterogeneous networks comprising of macro and small cells with massive MIMO arrays. In this context, near optimal user-base station association and load balancing can be achieved with simple user-base station association mechanisms and rudimentary round-robin schedulers at each base station.

Embodiments of the invention have one or more of the following advantages with respect to the state-of-the-art network densification approaches:

1) Allow a substantial increase in the spectral efficiency (and throughputs) per unit area in hotspot areas by means of massive MIMO small cell systems, aggressive pilot reuse and fast (sub ms) user-proximity detection.
2) Allow a substantial increase in the spectral efficiency (and throughputs) per unit area in serving static and mobile users.
3) Rely on having users broadcast coordinated pilots over a set of concurrent RBs to assist in detection of users in the proximity of a base station.
4) Involve a broad range of pilot code designs combined with pseudorandom pilot allocation over the OFDM plane and channel estimation.
5) Allow channel estimation combined with compressed sensing in high frequency bands (include the mmWave band).
6) Allow pilot-code based user-proximity detection that can be also combined with a broad range of channel estimation algorithms based on UL pilot transmission to allow enhancing the multiplexing gains achieved in a variety of wireless transmission scenarios over a broad range of carrier frequencies.

One or more problems solved by one or more embodiments include the following:

1) Mechanisms for on-the-fly estimation at each base station of the large-scale channel coefficients of out-of-cell active users.
2) Mechanisms for on-the-fly estimation at each base station of the propagation channels between the base station and the strongest received out-of-cell active users. The estimated channels can be used for interference suppression to out-of-cell users in the DL, or to suppress interference in the UL from the strongest received out-of-cell active users.
3) Pilot code designs for UL pilot transmissions to be used across a cellular network.

Embodiments of the invention include methods and apparatuses for fast (e.g., sub ms) user-proximity detection and identification based on UL pilot transmission from a number of users sharing a common set of pilot dimensions over a set of concurrent RBs (or scheduling slots).

In one embodiment, the mechanism can be applied at each base station of a cellular network. This allows each base station to determine a subset of user channels that can be reliably estimated, and subsequently which user streams to transmit, and the beams for carrying these streams. Embodiments of the invention relies on judiciously choosing: (a) the number of users that use a common set of pilot dimensions across a set of concurrent RBs; (b) the design of pilot codes used by these users; (c) the mechanism for estimating the large-scale channel gains of nearby users; (d) the identity of the active nearby users in proximity of the base station, according to the estimate of the large-scale gains; and (e) the mechanism for estimating the small-scale channel coefficients of these users. As a result, the base station in the phase of data transmission can suppress the interference to nearby unintended users so as to increase the throughput of the nearby unintended users served by the base stations in other cells, translating in gains in spectral efficiencies achieved per unit area.

Embodiments of the invention enable a wireless network operator to increase the cell and cell-edge throughputs in massive MIMO cellular deployments. Embodiments of the invention allow users using the same pilot resources to be served simultaneously by the massive MIMO small cell systems. This allows network densification benefits to be realized together with large antenna arrays benefits, thereby enabling very large spectral efficiencies (and throughputs) per unit area. These deployments would allow the network operator to substantially increase the throughput per unit.

Detailed of Embodiments

Embodiments of this invention include protocols for aggressive uplink pilot sequence generation, pilot reuse and assignment across cellular network, in conjunction with methods and apparatuses for base stations to estimate large-scale channel gains of nearby users, fast active-user proximity detection at the associated base stations, and estimating small-scale channel coefficients of these identified nearby users. Embodiments of the invention can enable large densification benefits to be realized in the DL of wireless networks. In one embodiment, fast channel estimation is performed at the base station in TDD systems owing to the channel reciprocity. The techniques described herein can increase the user throughput per unit area by applying multi-user MIMO and by suppressing the interference received at cell-edge users.

Although not described in detail, the same UL pilot reuse protocols and the corresponding "on-the-fly" user proximity detection mechanisms can be used also for UL data transmission.

The methods disclosed herein are henceforth described in detail in the context of a cellular system with massive MIMO small cells. Without loss of generality, embodiments of this invention focuses on a setting involving a layout of J small cells with massive MIMO base stations, all operating on the same band and serving a set N of users. In one embodiment, OFDM transmission resources are split into "slots" or resource blocks (RBs), with each slot/RB corresponding to a contiguous block of OFDM subcarriers and symbols. In one embodiment, within each RB/slot, a subset of users are active, i.e., scheduled for transmission, in each cell.

In one embodiment, a block-fading channel model is assumed where the channel coefficients remain constant within each RB/slot. Let $S_j$ denote the multiplexing gain of base station j, so that base station j schedules (up to) $S_j$ users for data transmission within each RB/slot. In addition, each user has been (uniquely) associated to a base station (e.g., via the user-centric association method in D. Bethanabhotla, O. Y. Bursalioglu, H. C. Papadopoulos, and G. Caire, "Optimal user-cell association for massive MIMO wireless networks," submitted to IEEE Trans. Wireless Comm., 2014. Available at arXiv: http://arxiv.org/abase station/ 1407.6731) and j*(k) denotes the index of the base station associated with user k. Also, let $N_j$ denote the set of users associated with base station j with cardinality $|N_j|=N_j$, and $\alpha_k$ denote the activity fraction of user k with respect to its uniquely associated base station j*(k).

In one embodiment, each base station j uses the knowledge of activity fractions of the user set it serves, i.e., of the $\alpha_k$'s for all the user indices k that belong to $N_j$, to construct a scheduling policy over a set of RBs, which schedules each user k in the set $N_j$ at a fraction that is approximately equal to a desired activity fraction $\alpha_k$. With round-robin scheduling within each cell, all $N_j$ users in cell j equally share the transmission resources, and thus the activity fraction $\alpha_k$'s of all these users equal $\min(1, S_j/N_j)$, implying that every user should be scheduled by base station j for (UL pilot+DL data) transmission on a fraction of the RBs that is $\min(1, S_j/N_j)$. In one embodiment, each base station performs such scheduling independently of the other base stations and the scheduling policy used by base station j (i.e., the IDs of the users scheduled in each scheduling slot) is not shared with any other base station. Also, without loss of generality, the wireless communication system is a sufficiently loaded system, so that $N_j$ is not smaller than the base station multiplexing gain $S_j$, i.e., $N_j \geq S_j$, so that the activity fraction $\alpha_k$'s of all users in cell j are given by $S_j/N_j$.

In one embodiment, all users' channels remain constant during the set of time-frequency resource elements (REs) comprising an RB/slot. In each RB, each of the $S_j$ active users at cell j (i.e., each user scheduled for transmission in the cell with base station j) transmits an UL pilot over Q "pilot" dimensions (over Q REs) that have been allocated for pilot transmission. In one embodiment, for every base station j, the multiplexing gain S at base station satisfies Q>S so that there are extra available signaling dimensions at each cell for combating interference imposed to users in nearby cells. That is, the multiplexing gain offered by the base station in each cell is given by $\min(Q, S_j)$. If and only if $Q>S_j$, then there are extra $Q-S_j$ resource elements available for uplink pilot transmission that will allow the base station to estimate the channels of nearby out-of-cell users. Subsequently, in addition to serving its own $S_j$ in-cell users, the base station can also mitigate interference to some (or all) of these nearby out-of-cell users.

$K_j$ and K denote the set of active users at cell j and throughout the network, respectively. To simplify notation, let $K=\{1, 2, \Lambda, K\}$ where $K=\Sigma_{j=1}^{J} S_j$ and $S_j=|K_j|$. Also, note that j*(k) is the unique index for which k belongs to the set $K_j$. Consider a generic RB and for any given active user k in the set K, and assume that user has been assigned to transmit an Q×1 uplink pilot $\sqrt{\gamma_p} a_k$, where $a_k$ denotes the unit-norm normalized version of the UL pilot vector used by the k-th active user and $\gamma_p$ represents the a priori known UL pilot transmit energy.

In one embodiment, each base station knows all the pilot vectors (including those used at nearby base stations). From an implementation point of view, each of the $S_k$ active users in cell k within any given slot is given a distinct pilot code out of a set of $S_k$ pilot codes available at base station k and these codes are assumed known a priori to the neighboring base stations. In a practical system, this would imply that the pilots are specific to each base station, i.e., base station j assigns $S_j$ codes to its active users and that set of codes is known to all nearby base stations. On the other hand, a base station is assumed not to know the scheduling policies of nearby base stations. Hence, the identities of nearby active users scheduled within each RB by nearby base stations (and thus the users in nearby cells using these uplink pilots) are unnecessary at base station j.

The received signal at the M-dimensional array of base station j from all the pilot transmissions in the network during the Q REs allocated for UL pilots (after rescaling by $1/\gamma_p$) can be expressed in the form of the following Q×M matrix:

$$Y_j = \sum_{k=1}^{K} a_k h_{kj}^T + W_j \qquad \text{(Eqn. 1)}$$

where $h_{kj}$ denotes the M×1 channel between the antenna of the k-th active user (i.e., the user assigned the k-th UL pilot code) and the M antennas of base station j. This invention assumes that $h_{kj}$ comprises of $\mathcal{CN}(0, g_{kj})$ IID entries and the $h_{kj}$'s are independent in k and j. Also, W represents the noise, and each entry is modeled as IID and obtained from the distribution $\mathcal{CN}(0, \sigma_w^2)$, where $\sigma_w^2 = N_o/\gamma_p$ and $N_o$ denotes the thermal noise power.

In one embodiment of a cellular system in which each cell independently schedules its users, any given base station does not know the identities of the scheduled users in the neighboring cells. In one embodiment, base station j knows the $g_{kj}$'s for all users with index k in the set $K_j$ (intra-cell users), but it does not know the $g_{kj}$'s for any k that is not in the set $K_j$. In another embodiment, base station j does not know $g_{kj}$'s for all active users, including those in its cell. Without loss of generality, embodiments described herein are presented in the context of the latter scenario.

In one embodiment, the disclosed techniques are used to enable interference suppression in the DL of a TDD system with reciprocity-based training. Based on the received signal over the Q UL pilot resource elements, in the data portion of the RB, base station j sends dedicated information-bearing signals to each of its active users on a locally designed precoder. Without loss of generality, in one embodiment, linear precoding options are used where (during the data transmission portion of the RB) base station j transmits the following M×1 signal vector over its M-dimensional array $$x_j = \sum_{k \in \mathcal{K}_j} v_k u_k \qquad \text{(Eqn. 2)}$$

where $u_k$ is the information bearing signal for user k and $v_k$ denotes the corresponding precoding vector satisfying $\|v_k\|^2=1$. Also, let $E[|u_k|^2]=p_k$ and assume a power constraint of the form $$\sum_{k \in \mathcal{K}_j} p_k \leq P_j. \qquad \text{(Eqn. 3)}$$

The received signal at the active user k during the data-transmission portion is given by $$y_k^{DL} = \sum_{j \in J} h_{kj}^T x_k + w_k^{DL} \qquad \text{(Eqn. 4)}$$

where $w_k^{DL}$ represents the thermal noise and comprises of ED $\mathcal{CN}(0, N_o)$ entries.

The disclosed techniques can be also used for enabling interference suppression in the UL (for either TDD or FDD transmissions) as well as for other purposes. Specifically, the techniques disclosed below can be used at base station j to estimate the large-scale gains of active users not only inside but also outside cell j from the observation of $Y_j$. In principal, $Y_j$ allows estimating the large-scale gains of as many as $Q^2$ users. Subsequently, base station j determines the nearby users in the nearby cells (e.g., it can determine the indices of the pilot codes with the largest gains to base station j). With this information, base station j then estimates the channels of these dominant users from $Y_j$. These channel estimates can then be taken into consideration in designing the precoder, i.e., in order to choose the sets $\{v_k, p_k\}$ at base station j for all users with index k in the set $K_j$, so as to mitigate the pilot contamination levels to the out-of-cell users with significant channel gains.

In one embodiment, channel estimation at a given base station j is based on observation of (Eqn. 1) resulting from the L pilots that are transmitted over a generic RB by the set of active users, i.e., scheduled in that RB. To simplify the notation, the dependence of variables on the base station index j is omitted and (Eqn. 1) is restated in the following form:

$$Y = \sum_{k=1}^{K} a_k h_k^T + W \quad \text{(Eqn. 5)}$$

where the M×1 vector $h_k$ has IID $C\mathcal{N}(0, g_k)$ entries and the large-scale gains $g_k$'s are unknown to the base station. Note that although K is used to denote the total number of all active users in the network, only the active users sufficiently close to cell j matter. Thus, K is possibly large but finite. In accordance with (Eqn. 1), the noise matrix W in (Eqn. 5) is assumed to have ED $C\mathcal{N}(0, \sigma_w^2)$ entries, and the random variables in W and $h_k$ are assumed to be independent. It is convenient to also express Y in the form $$Y=[y(1)y(2)\Lambda y(M)] \quad \text{(Eqn. 6a)}$$

where $$y(n)=Ah(n)+w(n) \quad \text{(Eqn. 6b)}$$

where w(n) is the n-th column of W, and $$h(n)=[h_{1n}h_{2n}\Lambda h_{Kn}]^T \quad \text{(Eqn. 6c)}$$

where $h_{kn}$ is the channel between the antenna of user k and the n-th antenna of base station j, and $$A=[a_1 a_2 \Lambda a_K] \quad \text{(Eqn. 6d)}$$

In one embodiment, based observation of Y, the base station first estimates the large-scale gains of all users (sufficiently close to the base station) and subsequently estimates the small-scale fading coefficients.

In one embodiment, consider the problem of estimating the vector of the large-scale user-channel gains $$g=[g_1 g_2 \Lambda g_K]^T \quad \text{(Eqn. 7)}$$

based on observation of Y from (Eqn. 5). Let $R_y$ denote the covariance matrix of each Q×1 column of the matrix Y, i.e., $$R_y = E[y(n)y^H(n)] = \sum_{k=1}^{K} g_k a_k a_k^H + \sigma_w^2 I. \quad \text{(Eqn. 8)}$$

Embodiments of the invention leverage the presence of a large array of the base station (for large M) which allows the base station to accurately estimate the covariance matrix $R_y$ from observation of Y. In one embodiment, the base station obtains the estimate the sample covariance matrix $$\hat{R}_y = \frac{1}{M}\sum_{n=1}^{M} y(n)y^H(n). \quad \text{(Eqn. 9)}$$

Provided M is sufficiently large, $\hat{R}_y$ is an accurate estimate of $R_y$. Consequently, it is worth considering first the problem of estimating (or rather being able to determine) the $g_k$'s based on knowledge of $R_y$. To do this, define $R_s=R_y-\sigma_w^2 I$ and $r_s=vec(R_s)$ where the vec(•) operator takes a matrix and concatenates its elements column-by-column to build one large column-vector containing all the elements of the matrix. (Eqn. 8) can then be re-expressed in the following equivalent form:

$$r_s=Dg+z \quad \text{(Eqn. 10)}$$

with the $Q^2 \times K$ matrix D which is given by $$D=[d_1 d_2 \Lambda d_K] \quad \text{(Eqn. 11a)}$$

where $$d_k=vec(a_k a_k^H) \quad \text{(Eqn. 11b)}$$

and $$z=vec(\sigma_w^2 I). \quad \text{(Eqn. 11c)}$$

Inspection of (Eqn. 10) reveals that if $K>Q^2$ the system of linear equations is under-determined, so g cannot be uniquely determined from $r_s$. In contrast, if $K \geq Q^2$ the vector g can be uniquely determined from $r_s$, provided the pilot matrix A (i.e., the pilot vectors $a_k$ for each k) is chosen such that D from (Eqn. 11) has full column rank.

First, consider the scenario where $K \geq Q^2$. There are several approaches of constructing A for which D obtained from (Eqn. 11) has full column rank.

In one embodiment, a set of pilot codes $\{a_k\}$ are generated offline, and only a subset of these codes is assigned to each base station. In one embodiment, each pilot code $a_k$ is generated as a pseudo-random vector (for each k) with complex-valued $C\mathcal{N}(0,1)$ entries and then is rescaled to unit norm. This approach yields a matrix D which has full column rank almost surely. In one embodiment, each pilot code $a_k$ is generated as a vector (for each k), where each entry is with the amplitude $1/\sqrt{M}$ and a random phase followed from the uniform distribution $\mathcal{U}(0, 2\pi)$. This approach also yields a matrix D which has full column rank almost surely. In one embodiment, each pilot code $a_k$ is generated through Grassmannian line packing, which provides a property that the angle between any two lines is as larger as possible (the resolution between any two lines cannot be too small), so as to avoid the possibility of rank deficiency of the matrix D. Specifically, Grassmannian line packing is equivalent to solving the optimization problem:

$$\max_{a_k, k=1,\Lambda, K} \min_{i \neq j} \|a_i^H a_j\|_F^2 \quad \text{(Eqn. 12a)}$$

$$\text{subject to } \|a_k\|_F^2 = 1, k = 1, \Lambda, K.$$

for designing both amplitude and phase of each entry of code vectors, and to solving the optimization problem:

$$\max_{a_k, k=1,\ldots K} \min_{i \neq j} \|a_i^H a_j\|_F^2 \quad \text{(Eqn. 12b)}$$

$$\text{subject to } (a_k)_i = 1/\sqrt{M}, \quad \begin{aligned} i &= 1, \ldots, M, \text{ and} \\ k &= 1, \ldots, K. \end{aligned}$$

for designing only the phase of each entry of code vectors. Also, optimization problems defined in Eqn. 12a and Eqn. 12b have modified versions, including, but not limited to, restricting the codes to be real-valued. There is a large body of literature on the design and testing of Grassmannian line packing algorithms. See for example, J. H. Conway, R. H. Hardin, N. J. A. Sloane, "Packing Lines, Planes, etc.: Packings in Grassmannian Space", Experimental Mathematics, No. 5, 1996, pp. 139-159.

In another embodiment, a set of pilot codes $\{a_k\}$ are generated offline for a group of adjacent F cells, and reused for every group of F cells cross the entire network. In addition, within each group, each user k is assigned a unique pilot code. This is similar to the spatial reuse concept for UL training in TDD systems and/or DL training and data transmission in FDD systems. Specifically, start from the first group where each pilot code $a_k$ is. Without loss of generality, denote by the matrix $A_1$ the pilot vectors generated and assigned to all the users in the first group. Next, a Q×Q unitary matrix U is generated. Finally, the pilot matrix $A_n = U^{n-1} A_1$ (consisting of Q vectors) is computed and assigned to the n-th cell group. Among the three steps above, the construction of $A_1$ in the first step can follow from any of the three approaches described in last paragraph; in the second step, there are two approaches disclosed herein to construct the unitary matrix U. In one embodiment, U is generated via matrix decomposition, such as Singular Value Decomposition. In one embodiment, U can be carefully designed so that the distance between any two vectors assigned to neighboring cell groups is as large as possible. Given the construction of $A_1$ in the first step, it is equivalent to solving the optimization problem $$\max_{\substack{U \\ n=1,2,\Lambda}} \min_{i \neq j} \|a_i^H U^{n-1} a_j\|_F^2 \quad \text{(Eqn. 13)}$$

$$\text{subject to } U^H U = 0$$

where $a_i$ and $a_j$ are every possible two column vectors chosen from $A_1$.

Besides the approaches of generating the pilot codes $\{a_k\}$ for all users described above, there are two approaches to assign pilot dimensions, i.e., the set of Res, to the adjacent F cells comprising a cell group. In one embodiment, the Q pilot dimensions (REs) assigned to each cell are orthogonal that assigned to the other cells as long as $K_j \leq Q^2$ for each $j \in J'$ where J' is the set of the base stations to form a group. In one embodiment, the Q pilot dimensions (REs) assigned to each cell are allowed to have overlap dimensions with others as long as $\Sigma_{j \in J'} K_j \leq |\cup_{j \in J'} \mathcal{Q}_j|^2$ where $\mathcal{Q}_j$ is the set of Q pilot dimensions (REs) assigned to base station j. FIGS. 1A-1C show one such example of orthogonal pilot dimension assignment and non-orthogonal pilot dimension assignment.

Next, given that D has full column rank (of course this means $K \leq Q^2$), the sample covariance matrix $\hat{R}_y$ from (Eqn. 11) is used in place of (the unknown) $R_y$, and the base station estimates the vector g as follows. First, an estimate of $R_s = R_y - \sigma_w^2 I$ is formed. In particular, the following matrix is computed.

$$\bar{R}_s = \hat{R}_y - \sigma_w^2 I. \quad \text{(Eqn. 12a)}$$

Since the matrix $\bar{R}_s$ is Hermitian by construction, i.e., $\bar{R}_s = \bar{R}_s^H$, its eigen-decomposition is of the form $$\bar{R}_s = \bar{V}_s \bar{\Lambda}_s \bar{V}_s^H \quad \text{(Eqn. 12b)}$$

where $\bar{V}_s$ and $\bar{\Lambda}_s = \text{diag}(\bar{\lambda}_1 \ \bar{\lambda}_2 \ \Lambda \ \bar{\lambda}_Q)$ are the eigenvector and eigenvalue matrices in its eigen-decomposition. Note that although the eigenvalues are guaranteed to be real they are not guaranteed to be non-negative (as required for $\bar{R}_s$ to be a valid covariance matrix). Hence, to guarantee the estimate of $R_s$ to be a valid covariance matrix, the following matrix is formed as the estimate of $R_s$:

$$\hat{R}_s = \bar{V}_s \hat{\Lambda}_s \bar{V}_s^H \quad \text{(Eqn. 12b)}$$

where $$\hat{\Lambda}_s = \text{diag}(\hat{\lambda}_1 \ \hat{\lambda}_2 \ \Lambda \ \hat{\lambda}_Q) \quad \text{(Eqn. 12d)}$$

and $$\hat{\lambda}_q = \begin{cases} \bar{\lambda}_q & \text{if } \bar{\lambda}_q \geq 0 \\ 0 & \text{otherwise} \end{cases}. \quad \text{(Eqn. 12e)}$$

Given $\hat{R}_s$ has been computed, the estimate of the vector g can be obtained by means of solving the following problem $$\min_g \left\| \hat{R}_s - \sum_{k=1}^{K} g_k a_k a_k^H \right\|_F^2 \quad \text{(Eqn. 13)}$$

$$\text{subject to } g \geq 0$$

This is a standard quadratic programming (QP) problem that can be readily solved by standard QP solvers. Aside from designing the pilot codes described above, efficient algorithms can be designed to allow solutions with low complexities to the QP problem in (Eqn. 13).

There is also the issue of which estimator to use for estimating $R_y$. In one embodiment, the sample covariance estimator is designed as (Eqn. 9) where M>>Q and each $h_k$ has ED entries, and thus the bias of the sample covariance estimator is small. In another embodiment, if the degrees of freedom in the channel $h_k$'s are possibly much fewer than M, then the bias of the sample covariance estimator (Eqn. 9) could prove a factor and other techniques can be used to estimate the $g_k$'s, such as G-estimation type techniques.

After considering the scenario where $K \leq Q^2$, next consider the scenario where $K > Q^2$ and the $Q \times M_{matrix}$ D has full row rank but only a small subset of K users, less than Q users, have dominant $g_k$'s. Since the number of users for which the pilot codes are designed is not limited by Q, each user can be assigned a permanent code to use, even when users move from one cell to another. There are two methods to estimate $g_k$'s. In one embodiment, follow the several approaches described above until (Eqn. 13) for the scenario where $K \leq Q^2$, and the problem can be readily solved by standard QP solvers. In another embodiment, since the channel matrix comprising of the channel gains of all the K users is sparse (only a small subset of K users, less than Q, have dominant $g_k$'s, and thus the vector g is sparse), a "compressed sensing" type of formulation can be leveraged. For more information on compressed sensing, see Bajwa et al, "Compressed channel sensing: A new approach to estimating sparse multipath channels," Proc. of the IEEE, vol. 98, no. 6, pp. 1058-1076, June 2010 and Ao et al., "Compressed Sensing-based Pilot Assignment and Reuse for Mobile UEs in mmWave Cellular Systems," Proc. of 2016 IEEE ICC, Kuala Lumpur, Malaysia, May 2016.

Consequently, starting from (Eqn. 10) and replacing $r_s$ in $r_s = Dg + z$ with $\hat{r}_s$ where $\hat{r}_s = \text{vec}(\hat{R}_s)$, results in $$\hat{r}_s - z = Dg, \quad \text{(Eqn. 14)}$$

and then g can be obtained by means of solving the following compressed sensing problem $$\min_g \|g\|_1 \quad \text{(Eqn. 15)}$$
$$\text{subject to } \|D^H(\hat{r}_s - z)\|_\infty \le \varepsilon$$
$$g \ge 0$$

where and $\|\cdot\|_1$ and $\|\cdot\|_\infty$ represent the 1-norm and the infinity norm, respectively, and $\varepsilon$ is a system parameter that can be chosen to control the error.

Once the estimate $\hat{g}$ is obtained by solving (Eqn. 13) or (Eqn. 15), the base station proceeds to obtain the estimates of the $h_k$'s. This description discloses the general form where the base station estimates all the out-of-cell user channels. However, in one embodiment, the base station estimates the channel $h_k$ only for user k for which the estimate $\hat{g}_k$ is non-negligible. In general, this would be true only for a small subset of the out-of-cell users.

First, consider the problem of estimating $h_k$ based on Yin (Eqn. 5) with g known. The solution to this problem is well-known. It is a special case of the standard problem of estimating a signal via observation of linear functions of it in the additive white Gaussian noise. For completeness, the estimator is restated next. First, let $$H = [h(1)h(2) \Lambda h(M)], \quad \text{(Eqn. 16)}$$

and the estimation problem can be recast as: estimate H via observation of Y=AH+W. Since $$R_h = E[h(n)h^H(n)] = G = \text{diag}(g_1 g_2 \Lambda g_K) \quad \text{(Eqn. 17)}$$

the MMSE estimate of H is given by $$\hat{H}_{MMSE} = GA^H[AGA^H + \sigma_w^2 I]^{-1} Y. \quad \text{(Eqn. 18)}$$

Given that $g_k$'s (and thus G) are unknown, the base station uses instead the estimate of $g_k$'s obtained by solving (Eqn. 13) or (Eqn. 15). Specifically, the base station obtains the following estimate of H $$\hat{H} = \hat{G}A^H[A\hat{G}A^H + \sigma_w^2 I]^{-1} Y \quad \text{(Eqn. 19a)}$$

where $\hat{G}$ is given by $$\hat{G} = \text{diag}(\hat{g}_1, \hat{g}_2 \Lambda \hat{g}_K) \quad \text{(Eqn. 19b)}$$

where the $\hat{g}_k$'s are given by the solution of (Eqn. 13). Noting that $$\hat{H} = [\hat{h}(1)\hat{h}(2) \Lambda \hat{h}(M)] = [\hat{h}_1 \hat{h}_2 \Lambda \hat{h}_k]^T \quad \text{(Eqn. 20)}$$

As mentioned above, only the rows of $\hat{H}$ corresponding to significant $\hat{g}_k$'s values would be computed by the base station in practice.

Although embodiments focused the exposition assuming quasi-static channels, the techniques can be extended in principle to the general setting where wideband pilots are sent in the uplink by all users, and assuming sparsity in the channel (in AoA, AoD, multipath spread) users are detected and their channels are subsequently estimated. Such on-the-fly large-scale channel estimation is ideally suited for mmWave scenarios, where user channels decorrelate even faster. An extension of the techniques of this section for frequency-selective time-nonselective user channels over the RB is discussed next.

Embodiments Over OFDM for Linear Time Invariant (LTI) Channels

In this section, consider the problem of channel estimation at a given base station based on UL pilots broadcasted by a set of K scheduled users in the UL. In one embodiment, all these K users are active and known to be in the vicinity of base station j, OFDM type transmission is used and over the set of T OFDM symbols spanning the RB (and thus used for UL training and data transmission) the channel between active user k and base station j is time-invariant. In particular, the channel between user k and the m-th antenna of the base station during time-frequency element [t, f] is given by $$h_k[t, f; m] = \sum_{n=1}^{N} h_{k,n}(m) e^{j\omega_{k,n} f} \quad \text{(Eqn. 19)}$$

where $h_{k,n}(m)$ is the channel impulse of the n-th of N multipaths at the m-th antenna of the base station. Also, assume that the $h_{k,n}(m)$'s are independent in k, n, m, and $h_{k,n}(m) \sim \mathcal{CN}(0, \rho_{k,n})$ with $\rho_{k,n}$ unknown. In addition, let $$g_k = \sum_{n=1}^{N} \rho_{k,n}. \quad \text{(Eqn. 20)}$$

The K users transmit UL pilots over all [t, f] elements with $t \in \{1, 2, K, T\}$ and $f \in \{1, 2, K, F\}$. Denoted by $a_k[t, f]$ the scalar (complex-valued) pilot transmitted by user k over [t, f]. Thus, the m-th antenna of the base station receives:

$$y[t, f; m] = \sum_k h_k[t, f; m] a_k[t, f] + w[t, f; m] \quad \text{(Eqn. 21)}$$

Averaging over the massive array results in accurate estimates of $$R_y[t_1, f_1; t_2, f_2] = E[Y[t_1, f_1; m] y^*[t_1, f_1; m]] \quad \text{(Eqn. 22)}$$

for all $t_1, t_2 \in \{1, 2, K, T\}$ and $f_1, f_2 \in \{1, 2, K, F\}$. Thus, estimates are given by:

$$R_y[t_1, f_1; t_2, f_2] = \sum_{k=1}^{K} \sum_{n=1}^{N} \rho_{k,n} e^{j\omega_{k,n}(f_1 - f_2)} a_k[t_1, f_1] a_k^*[t_2, f_2] + \sigma_w^2 \delta[t_1 - t_2] \delta[f_1 - f_2] \quad \text{(Eqn. 23)}$$

for all $t_1, t_2 \in \{1, 2, K, T\}$ and $f_1, f_2 \in \{1, 2, K, F\}$ where $R_y[t_1, f_1; t_2, f_2]$ is known via the base station's observation but $\{\rho_{k,n}, \omega_{k,n}\}$ (and thus the $g_k$'s) are unknown. Since the multipath channel of user k has N taps (of unknown delays and magnitudes), there are a total of $T^2 F^2$ equations and 2NK unknowns.

In one embodiment, proximity detection is used, i.e., identifying the subset of users with significant $g_k$ levels. Evaluating (Eqn. 23) for $f_1 = f_2 = f$ results in $$R_y[t_1, f; t_2, f] = \sum_{k=1}^{K} g_k a_k[t_1, f] a_k^*[t_2, f] + \sigma_w^2 \delta[t_1 - t_2] \quad \text{(Eqn. 24)}$$

which is valid for any $t_1, t_2 \in \{1, 2, K, T\}$ and $f \in \{1, 2, K, F\}$ Noting that rewrite the set of $T^2F$ observations (Eqn. 24) in the form (Eqn. 8) with K unknowns, and then all the analysis and statements regarding estimation of the $g_k$'s above based on (Eqn. 8) carry through. For instance, by properly designing the $a_k[t, f]$ set, the $g_k$'s can be recovered from (Eqn. 24) provided $T^2F \geq K$. This mechanism can also be used to "eliminate" users not in proximity, and then perform channel estimation over the remaining subset of users. If $T^2F < K$, compressed sensing type channel estimation (exploiting channel tap sparsity) can be used, based on (Eqn. 15) over mm-wave channels as described in W. U. Bajwa, J. Haupt, A. M. Sayeed, and R. Nowak, "Compressed channel sensing: A new approach to estimating sparse multipath channels," Proc. of the IEEE, vol. 98, no. 6, pp. 1058-1076, June 2010. In one embodiment, a mechanism can use the "virtual" or canonical representation of each user's channel such as described in David Tse, Pramod Viswanath, "Fundamentals of Wireless Communication," Cambridge University Press, 2005, where N is the multipath length, $\omega_{k,n} = -2\pi n/N_c$, and $N_c$ is the number of tones in the OFDM system (one important option is of course to have $F = N_c$). Note that any sparse channel reconstruction algorithm can be applied at this stage.

In one embodiment, evaluating (Eqn. 23) for $t_1 = t_2 = t$ results in $$R_y[t, f_1; t, f_2] = \quad \text{(Eqn. 25)}$$
$$\sum_{k=1}^{K} \sum_{n=1}^{N} \rho_{k,n} e^{j\omega_{k,n}(f_1 - f_2)} a_k[t, f_1] a_k^*[t, f_2] + \sigma_w^2 \delta[f_1 - f_2]$$

which is valid for any $t \in \{1, 2, K, T\}$ and $f_1, f_2 \in \{1, 2, K, F\}$. Noting that rewriting the set of $TF^2$ observations (Eqn. 25) in the form (Eqn. 8) is associated with 2NK unknowns $\{\rho_{k,n}, \omega_{k,n}\}$, each pair for the same n is coupled into one term $\rho_{k,n} e^{j\omega_{k,n}(f_1-f_2)}$. Thus, collecting the observations $R_y[t, f_1; t, f_2]$ over $f_1, f_2 \in \{1, 2, K, F\}$ and substituting $\omega_{k,n} = -2\pi n/N_c$, (Eqn. 25) can be further rewritten into a compact matrix form which is linear with the $\rho_{k,n}$'s:

$$R_y[t, f_1; t, f_2] - \sigma_w^2 \delta[f_1 - f_2] = \quad \text{(Eqn. 26)}$$
$$\sum_{n=1}^{N} e^{j\frac{2\pi n}{N_c}(f_2 - f_1)} \sum_{k=1}^{K} \rho_{k,n} q_k[t, f_1, f_2]$$

where $q_k[t, f_1, f_2] = a_k[t, f_1] a_k^*[t, f_2]$. Thus, $$R_y[t, f_1; t, f_2] - \sigma_w^2 \delta[f_1 - f_2] = \quad \text{(Eqn. 27)}$$
$$\sum_{n=1}^{N} e^{j\frac{2\pi n}{N_c}(f_2 - f_1)} \sum_{k=1}^{K} \rho_{k,n} q_k[t, f_1, f_2] =$$
$$b(t, f_2 - f_1) G q(t, f_1, f_2)$$

where $$b(t, f_2 - f_1) = \left[ e^{j\frac{2\pi}{N_c}(f_2-f_1)} \; e^{j\frac{2\pi \cdot 2}{N_c}(f_2-f_1)} \; \Lambda \; e^{j\frac{2\pi N_c}{N_c}(f_2-f_1)} \right], \quad \text{(Eqn. 28a)}$$

$$G = \begin{bmatrix} \rho_{1,1} & \rho_{2,1} & \Lambda & \rho_{K,1} \\ \rho_{1,2} & \rho_{2,2} & \Lambda & \rho_{K,2} \\ M & M & O & M \\ \rho_{1,N} & \rho_{2,N} & \Lambda & \rho_{K,N} \end{bmatrix}, \quad \text{(Eqn. 28b)}$$

$$q(t, f_1, f_2) = [q_1(t, f_1, f_2) \; q_2(t, f_1, f_2) \; \Lambda \; q_K(t, f_1, f_2)]^T. \quad \text{(Eqn. 28c)}$$

Similar to (Eqn. 10), (Eqn. 27) can also be written into the following more compact matrix form by letting $f_1, f_2$ choose every possible entry in the set $\{1, 2, K, F\}$. Specifically, let $$R_s[t] = R_y[t] - \sigma_w^2 I \quad \text{(Eqn. 29)}$$

where $R_y[t]$ is an $F \times F$ matrix with its m-th row n-th column entry given by $R_y[t, f_i; t, f_j]$, and then define $R_s[t] = R_y[t] - \sigma_w^2 I$, $r_s[t] = \text{vec}(R_s[t])$ and $g = \text{vec}(G)$. Then (Eqn. 26) is re-expressed in the following equivalent form:

$$r_s[t] = D[t] g \quad \text{(Eqn. 30)}$$

where $D[t]$ is an $F^2 \times NK$ matrix, and its l-th row is given by $\text{vec}(q(t, f_m, f_n) b(t, f_m - f_n)^T)^T$ and the corresponding foot script variables m and n can be determined by the equation $l = (n-1)F + m$. Since (Eqn. 30) has $F^2$ linear equations NK unknowns, the approaches introduced above can be directly applied to find out the multipath channel impulse g of all the K users, each with N multipaths.

Related Embodiments for Data Transmission

In one set of embodiments, the wireless communication system operates using TDD operation with reciprocity-based channel state information (CSI) acquisition, according to which each base station learns the DL channel on a given slot between its antenna array and an active user based on an UL pilot transmitted by the user within the given slot. Within each slot, Q pilot dimensions are allocated for UL pilots. In one embodiment, the Q pilot dimensions correspond to the Q time-frequency REs of the slot. In one embodiment, for the $K_j$ active users in cell j, each of the Q pilot dimensions can also be a code over Q pilot REs, with the Q pilot codes being orthogonal to one another. In one embodiment, these REs are elements of OFDM symbols preceding the OFDM REs used for DL data transmission. In one embodiment, the time-frequency elements on one or more OFDM symbols immediately following the OFDM symbols allocated to UL pilots are dedicated to base station processing (and may also allow the system to transition from UL (pilot) transmissions to DL data transmission). They provide the computation time necessary for the base station to process the received pilot transmissions and construct the precoded DL data signal that is to be transmitted over the remaining REs of the slot that follow.

In one embodiment, the channel estimates of out-of-cell users are used to design the transmission signal for in-cell users so as to proactively mitigate interference to a subset of out-of-cell users. In one embodiment, the subset is determined based on the large-scale estimates of out-of-cell users. In one embodiment, the subset is determined as those out-of-cell users with large-scale channel gains exceeding a certain threshold. In one such example, the interference to an out-of-cell user by a base station transmission is considered acceptable if the received (interfering-signal) power level in the downlink at the user terminal is within a certain amount of dB (e.g., 3 dB) in excess of the noise level. Using this value, together with the transmit power at the BS this can be turned into a threshold on the large-scale user channel gain and, in turn, a threshold on the maximum received uplink pilot signal level. In one embodiment, the subset corresponds to a set of out-of-cell users with the largest large-scale channel gains.

FIG. 2 illustrates the procedure to suppress the interference to a subset of out-of-cell users. Referring to FIG. 2, a central controller 001 is communicably connected to base stations 101, 201, etc. In one embodiment, the pilot sequence of each user spans Q dimensions, and each base station simultaneously serves K users and K<Q. Then each base station can first identify the indices of nearby users after estimating the large-scale channel gains. Next, the base station estimates the small-scale channel coefficients of the nearby users with significantly non-zero large-scale channel gains. In one embodiment, significantly non-zero large scale channel gains are those that are larger than a predetermined threshold where the predetermined threshold is, for example, the threshold in the paragraph immediately above, or the large-scale estimates divided by the largest large-scale estimate (so the ratio is no greater than one). Finally, in the phase of data transmission, the base station can zero-force the channels of nearby out-of-cell users. For example, after the base station 101 identifies the users with assigned pilots $a_1$, $a_2$, $a_3$, $a_4$, $a_5$, $a_7$, the identified users with assigned the pilots $a_5$, $a_7$ are out-of-cell users to base station 101.

Figure 3:
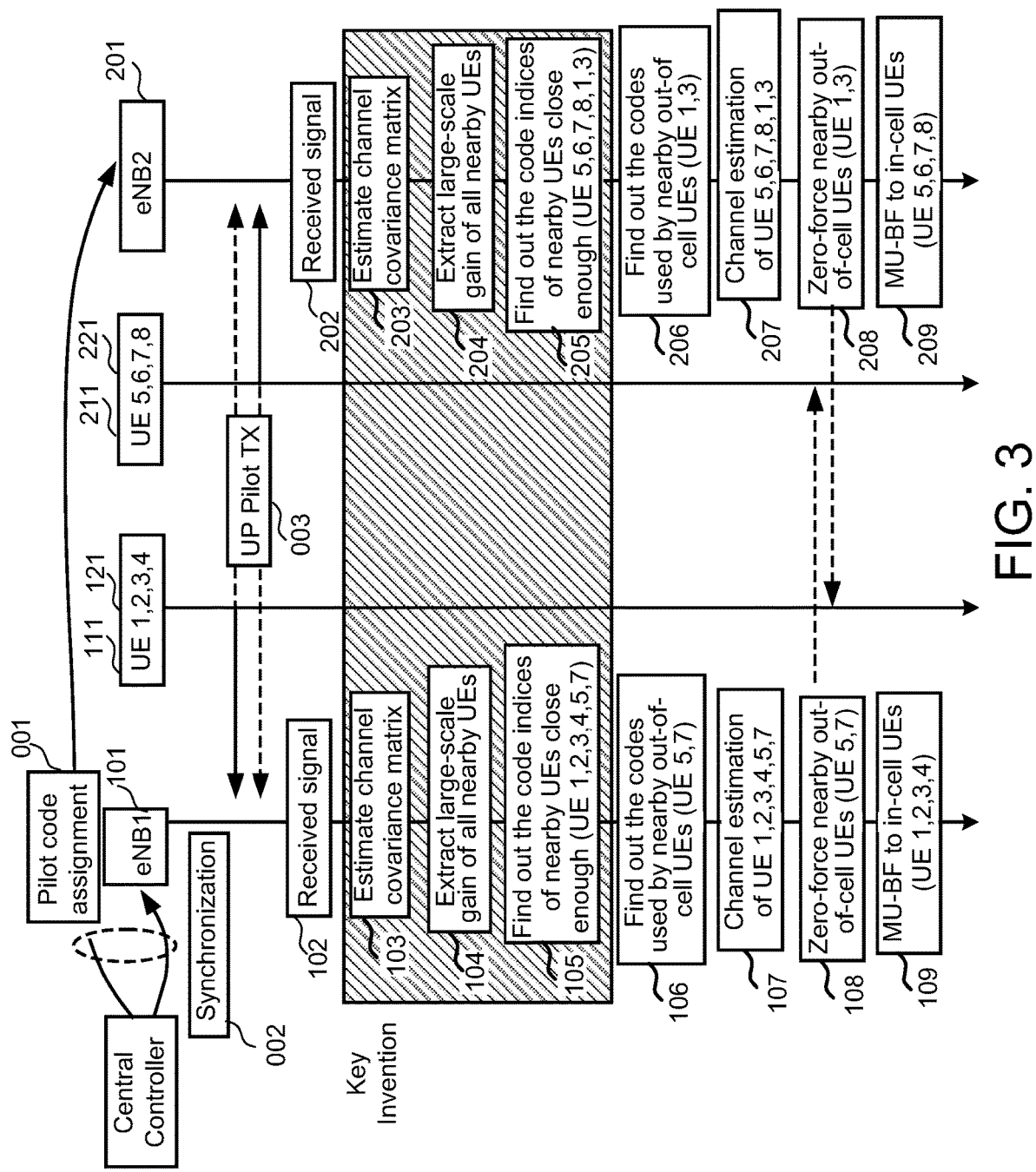
FIG. 3 illustrates a flow diagram of one embodiment of a process for suppressing interference to nearby out-of-cell user terminals.

FIG. 3 is a data flow diagram of one embodiment of a process for suppressing interference to out-of-cell users with significantly non-zero large-scale channel gains. Referring to FIG. 3, a central controller provides a pilot code assignment (001) to base stations 101 and 201. That is, the pilot codes for use by UEs in the cells containing base stations 101 and 201 are provided to both base stations 101 and 201. In FIG. 3, UEs 1, 2, 3 and 4 are associated with base station 101 while UEs 5, 6, 7, and 8 are associated with base station 201. In one embodiment, the operations in the cells containing base stations 101 and 201 are synchronized (002) and thereafter UL pilot transmission occurs (003) in which UEs 1, 2, 3, and 4 transmit pilots for base station 101, which causes interference, shown as the interference signal, to base station 201. At the same time, UEs 5, 6, 7, and 8 transmit pilots for base station 201, which causes interference, shown as the interference signal, to base station 101.

In response to the pilot transmissions, base stations 101 and 201 perform the same operations described above using processing logic that may comprise hardware, software, firmware or a combination of the three. More specifically, base station 101 receives the pilot transmissions (processing block 102), estimates the channel covariance matrix (processing block 103), extracts the large-scale gain of all nearby UEs (processing block 104) and determines the code indices of nearby UEs that are close enough (processing block 105). For example, in one embodiment, based on FIG. 2, the closest are UEs 1, 2, 3, 4, 5 and 7. Using this information, base station 101 determines the codes used by the nearby out-of-cell UEs (processing block 106). In the example, these would be UEs 5 and 7. Base station 101 generates channel estimates for the channels for that set of nearby UEs, namely UEs 1, 2, 3, 4, 5 and 7 in the example (processing block 107). Once the channel estimates are generated, base station 101 performs zero-forcing on the nearby out-of-cell UEs for interference suppression (processing block 108) (namely, UEs 5 and 7 in the example) and performs multi-user beamforming to in-cell UEs (processing block 109) (namely, UEs 1, 2, 3, and 4 in the example).

Similarly, and at the same time, base station 201 is performing the same set of operations. That is, base station 201 receives the pilot transmissions (processing block 202), estimates the channel covariance matrix (processing block 203), extracts the large-scale gain of all nearby UEs (processing block 204) and determines the code indices of nearby UEs that are close enough (processing block 205). For example, in one embodiment, based on FIG. 2, the closest are UEs 5, 6, 7, 8, 1 and 3. Using this information, base station 201 determines the codes used by the nearby out-of-cell UEs (processing block 206). In the example, these would be UEs 1 and 3. Base station 201 generates channel estimates for the channels for that set of UEs, namely UEs 5, 6, 7, 8, 1 and 3 in the example (processing block 207). Once the channel estimates are generated, base station 201 performs zero-forcing on the nearby out-of-cell UEs for interference suppression (processing block 208) (namely, UEs 1 and 3 in the example) and performs multi-user beamforming to in-cell UEs (processing block 209) (namely, UEs 5, 6, 7 and 8 in the example).

Figure 4:
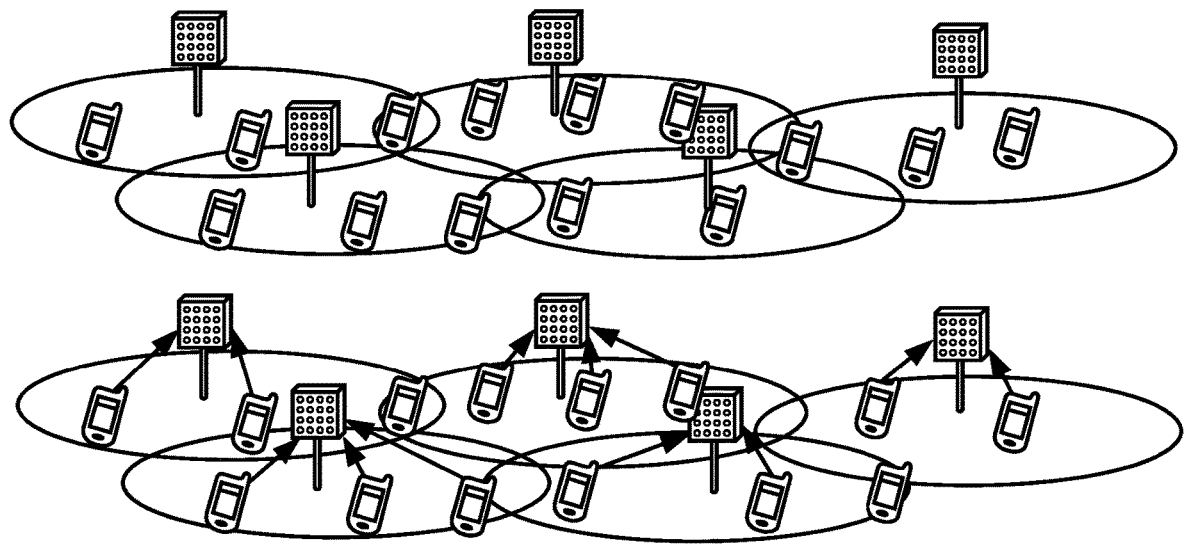
FIG. 4 illustrates an example of base station-user associations in cellular networks.
Figure 5:
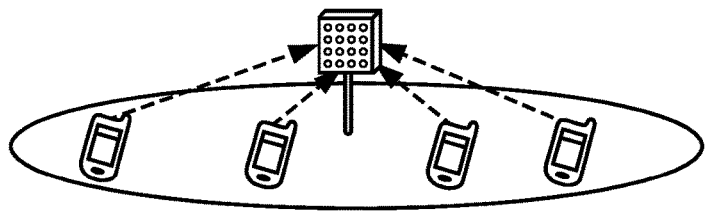
FIG. 5 illustrates an example of random accesses in cellular networks.

Besides interference suppression to nearby out-of-cell users, there are also several applications of the techniques described herein in cellular networks. In one embodiment, FIG. 4 shows user association after estimating the large-scale channel gains. Specifically, the base station collects a set of user indices with significantly non-zero large-scale channel gains, and then the base station associated with the users located in the service range of the base station from that set. In one embodiment, FIG. 5 shows a random access network where there are K users and each user accesses to the base station with probability p. Then the techniques described herein can be applied directly as long as $K \leq Q^2$ and $Kp \leq Q$.

Figure 6:
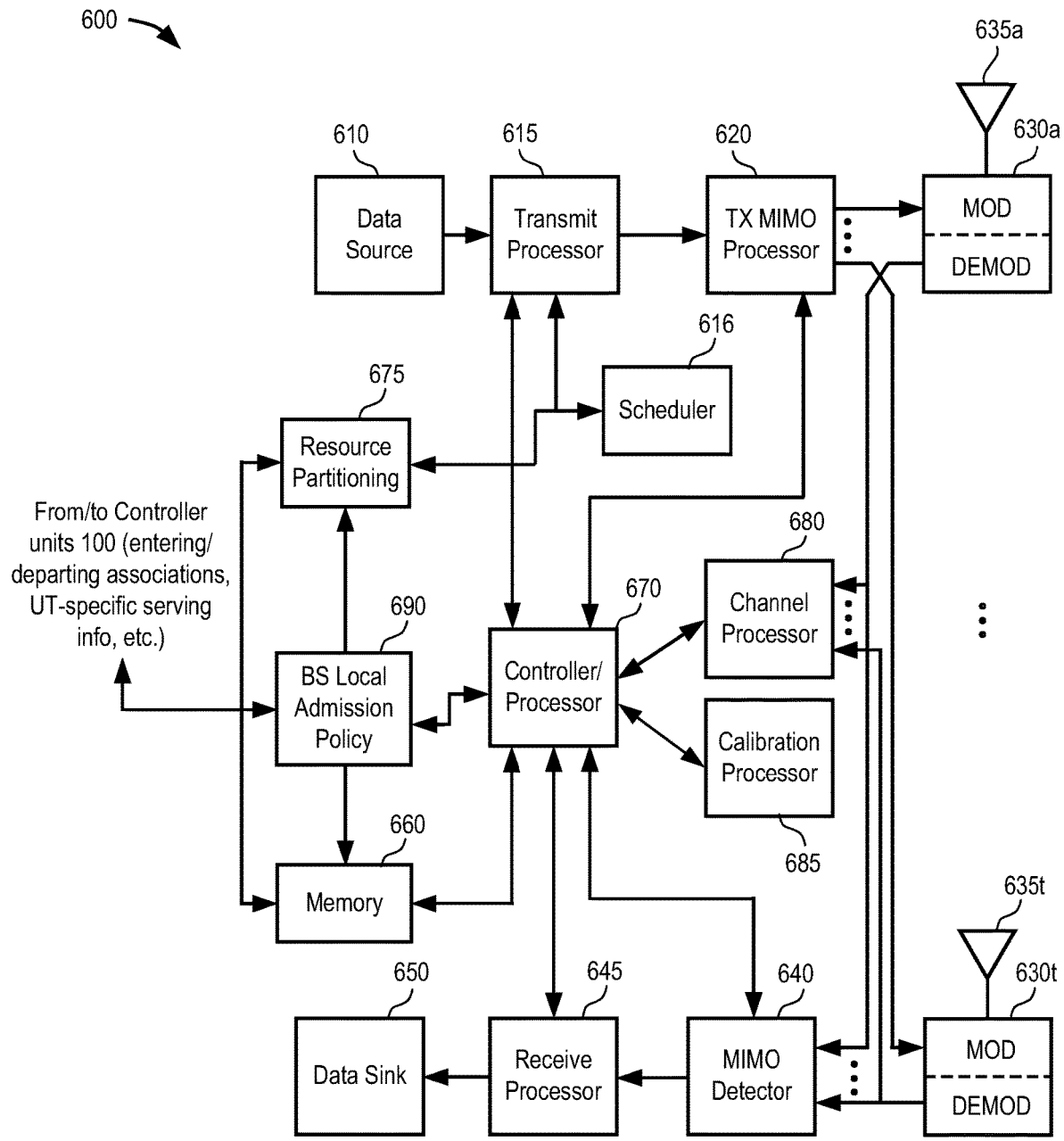
FIG. 6 is a block diagram of one embodiment of a base station.

FIG. 6 is a block diagram of one embodiment of a base station. Referring to FIG. 6, base station 600 includes standard modules for MIMO wireless transmission. A transmit processor 615 at base station 600 receives data for one or more UTs from a data source 610, processes the data for each UT and provides data symbols to all UTs. Processor 615 also receives and processes control information from a controller/processor 670 and provides control symbols. Processor 670 also generates reference symbols for one or more reference signals. A transmit (TX) MIMO processor 620 performs precoding on the data symbols, the control symbols, and/or the reference symbols for each UT as well as for reference signals for antennas co-located at the same base station 600 or to other wireless entities such as other base stations, remote radio heads (RRHs), etc.

Processor 620 provides parallel output symbols streams to modulators (MODS) 630a through 630t. Each modulator 630 further processes (e.g., convert to analog, amplify, filter, and upconvert) the output sample stream to obtain a downlink signal. The downlink signals from modulators 630a through 630t are transmitted via antennas 635a through 635t, respectively.

At base station 600, the uplink signals from various UTs or by other antennas, collocated at the same base station 600 or located at different base stations or other wireless entities, are received by antennas 635a through 635t and demodulated by demodulators (DEMODs) 630a-630t. The demodulated signals are detected by MIMO detector 640 and further processed by a receive processor 645 to obtain decoded data and control information sent by UTs and other wireless entities. Receive processor 645 receives detected signals from MIMO detector 640 and provides decoded data to a data sink 650 and control information to controller/processor 670. The demodulated signals output by DEMODs 630a through 630t are also provided to channel processor 680 where the uplink channel is estimated and provided to controller/processor 670.

In one embodiment, base station 600 also includes a calibration processor 685. Calibration processor 685 exchanges control information with controller/processor 670. In one embodiment, calibration processor 685 calculates calibration values, which may be used at controller/processor 670 together with uplink (UL) channel estimation to construct a downlink channel estimation, which is provided to TX MIMO Processor 620 for precoding. In one embodiment, processing at calibration processor 685 involves both the signaling and data collection aspects of calibration, which are based on the collected data, and, possibly additional parameters.

In one embodiment, base station 600 also includes scheduler 616. Scheduler 616 exchanges scheduling information with transmit processor unit 615. According to this information, transmit processor 615 requests the data of the scheduled users from data source 610. Scheduler 616 also provides the information of which uplink channel estimates belong to which users to channel processor 680. Scheduler 616 processes the information provided by one or more controllers, such as a controller in FIG. 6. The information provided by the one or more controllers includes activity fractions, various scheduling constraints, re-use constraints. Scheduler 616 takes input from resource partitioning (allocation) unit 675. Resource partitioning unit 675 takes, as input from base station local admission policy unit 690, the list of UTs that are currently associated to the base station, and possibly information indicative of UT-specific service differentiation. In turn, resource-partitioning unit 675 determines activity fractions to be provided to each UT associated with the base station. In one embodiment, this determination is performed according to the fairness objective chosen by an operator of the base station.

In one embodiment, base station local admission policy unit 690, which determines the local admission policy at the base station, is as disclosed herein.

In one embodiment, the uplink operation in FIG. 3 is performed by antennas 635a-635t and DEMODs 630a-630t which receive the UL signals; channel processor 680 that performs the channel estimation according to the method set forth herein. The downlink operation in FIG. 3 is performed by 610, 615, 620, antennas 635a-635t, DEMODs 630a-630t for transmitting DL signals. Some other blocks such as channel processor 680, controller/processor 670, calibration processor 685, etc. are also used to perform standard procedures as part of the method described herein.

There are a number of example embodiments described herein.

Example 1 is a method for data transmission in a cellular system comprising receiving transmissions of uplink pilot signals made in each slot, by a number of user equipments (UEs), over the radio resource elements in slots that are allocated for uplink pilot transmission, wherein the number of UEs in the vicinity of at least one base station exceeds the number of radio resource elements that have been allocated for uplink pilot transmission in the slot; estimating large-scale radio-channel propagation strengths of a plurality of nearby UEs to a base station; estimating radio-propagation channel coefficients between each base-station antenna and each UE in a subset of UEs in the plurality of nearby UEs that have large-scale radio-channel propagation strengths to the base station that are stronger than those UEs in the plurality of nearby UEs not part of the subset; and transmitting to in-cell UEs via multi-user beamforming, including suppressing interference to one or more nearby out-of-cell UEs that are part of the plurality of nearby UEs.

Example 2 is the method for data transmission in a cellular system of example 1 that may optionally include that suppressing interference to one or more nearby out-of-cell UEs comprises zero forcing the one or more nearby out-of-cell UEs.

Example 3 is the method for data transmission in a cellular system of example 1 that may optionally include estimating a channel covariance matrix of a received signal vector based on the received transmissions of uplink pilot signals.

Example 4 is the method for data transmission in a cellular system of example 1 that may optionally include determining pilot code indices of UEs in the subset of UEs.

Example 5 is the method for data transmission in a cellular system of example 4 that may optionally include determining a subset of pilot code indices of out-of-cell UEs in the subset of UEs, the base station being operable to use the subset of pilot code indices to select the one or more nearby out-of-cell UEs that are part of the plurality of nearby UEs for which the base station suppresses interference.

Example 6 is the method for data transmission in a cellular system of example 1 that may optionally include allocating a set of pilot signals to each of its scheduled users for pilot transmission.

Example 7 is the method for data transmission in a cellular system of example 1 that may optionally include that the allocated pilot signals comprise a unique pilot code allocated to each scheduled user in the vicinity of at least one base station.

Example 8 is the method for data transmission in a cellular system of example 1 that may optionally include allocating a set of radio resource elements in each slot for uplink pilot transmission.

Example 9 is the method for data transmission in a cellular system of example 1 that may optionally include that estimating channels of a subset of UEs in the plurality of nearby UEs comprises estimating strength of multipath components in the radio channel propagation between each scheduled user in the vicinity of the base station.

Example 10 is a non-transitory computer readable storage medium that stores instructions, which when executed on a base station, causes the base station to perform a method for data transmission in a cellular system comprising receiving transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot; estimating large-scale radio-channel propagation strengths of a plurality of nearby UEs to a base station; estimating radio-propagation channel coefficients between each base-station antenna and each UE in a subset of UEs in the plurality of nearby UEs that have large-scale radio-channel propagation strengths to the base station that are stronger than those UEs in the plurality of nearby UEs not part of the subset; and transmitting to in-cell UEs via multi-user beamforming, including suppressing interference to one or more nearby out-of-cell UEs that are part of the plurality of nearby UEs.

Example 11 is the computer readable storage medium of example 10 that may optionally include that suppressing interference to one or more nearby out-of-cell UEs comprises zero-forcing the one or more nearby out-of-cell UEs.

Example 12 is the computer readable storage medium of example 10 that may optionally include estimating a channel covariance matrix of a received signal vector based on the received transmissions of uplink pilot signals at the base station.

Example 13 is the computer readable storage medium of example 10 that may optionally include determining pilot code indices of UEs in the subset of UEs.

Example 14 is the computer readable storage medium of example 13 that may optionally include determining a subset of pilot code indices of out-of-cell UEs in the subset of UEs, the base station being operable to use the subset of pilot code indices to select the one or more nearby out-of-cell UEs that are part of the plurality of nearby UEs for which the base station suppresses interference.

Example 15 is the computer readable storage medium of example 10 that may optionally include allocating, by the base station, a unique pilot code allocated to each scheduled user in the vicinity of at least one base-station.

Example 16 is a base station comprising a plurality of antennas operable to receive transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot; transmitter and receiver logic coupled to the plurality of antennas; a processor coupled to the transmitter and receiver logic and operable to estimate large-scale radio-channel propagation strengths of a plurality of nearby UEs to a base station, estimate radio-propagation channel coefficients between each base-station antenna and each UE in a subset of UEs in the plurality of nearby UEs that have large-scale radio-channel propagation strengths to the base station that are stronger than those UEs in the plurality of nearby UEs not part of the subset, and transmit to in-cell UEs via multi-user beamforming, including suppressing interference to one or more nearby out-of-cell UEs that are part of the plurality of nearby UEs.

Example 17 is the base station of example 16 that may optionally include that the base station is operable to suppress interference to one or more nearby out-of-cell UEs by zero-forcing the one or more nearby out-of-cell UEs.

Example 18 is the base station of example 16 that may optionally include that the processor is operable to estimate a channel covariance matrix of a received signal vector based on the received transmissions of uplink pilot signals at the base station.

Example 19 is the base station of example 16 that may optionally include that the processor is operable to determine pilot code indices of UEs in the subset of UEs.

Example 20 is the base station of example 19 that may optionally include that the processor is operable to determine a subset of pilot code indices of out-of-cell UEs in the subset of UEs, the base station being operable to use the subset of pilot code indices to select the one or more nearby out-of-cell UEs that are part of the plurality of nearby UEs for which the base station suppresses interference.

Example 21 is the base station of example 16 that may optionally include that the processor is operable to assign a unique pilot code allocated to each scheduled user in the vicinity of at least one base station.

Example 22 is a wireless communication system comprising: a base station in a cell; a plurality of UEs, a first group of the plurality of UEs being in cell with respect to the base station and a second group of the plurality of UEs being out-of-cell with respect to the base station, wherein the base station is operable to detect pilots transmitted by nearby out-of-cell UEs, learns their channels, and suppresses interference to one or more of the nearby out-of-cell UEs.

Example 23 is the wireless communication system of example 22 that may optionally include that the base station suppresses interference by zero forcing the interference to at least one nearby out-of-cell UE.

Example 24 is the wireless communication system of example 22 that may optionally include that the base station comprises a memory to store UE pilot codes of out-of-cell UEs and is operable to use the out-of-cell UE pilot codes to identify the nearby out-of-cell UEs.

Example 25 is the wireless communication system of example 22 that may optionally include that the base station comprises: a plurality of antennas operable to receive transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot; transmitter and receiver logic coupled to the plurality of antennas; a processor coupled to the transmitter and receiver logic and operable to estimate large-scale channel gains of a plurality of nearby UEs, estimate channels of a subset of UEs in the plurality of nearby UEs that have large-scale channel gains that are stronger than those UEs in the plurality of nearby UEs not part of the subset, and transmit to in-cell UEs via multi-user beamforming, including suppressing interference to one or more nearby out-of-cell UEs that are part of the plurality of nearby UEs.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

In addition to any other claims, the applicant(s)/inventor(s) claim each and every embodiment of the technology described herein, as well as any aspect, component, or element of any embodiment described herein, and any combination of aspects, components or elements of any embodiment described herein.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for data transmission in a cellular system, the method comprising:
   receiving transmissions of uplink pilot signals made in each slot, by a number of user equipments (UEs), over the radio resource elements in slots that are allocated for uplink pilot transmission, wherein the number of UEs in the vicinity of at least one base station exceeds the number of radio resource elements that have been allocated for uplink pilot transmission in the slot;
   estimating large-scale radio-channel propagation strengths of a plurality of nearby UEs to a base station;
   estimating radio-propagation channel coefficients between each base-station antenna and each UE in a subset of UEs in the plurality of nearby UEs that have the large-scale radio-channel propagation strengths to the base station that are stronger than those UEs in the plurality of nearby UEs not part of the subset, the subset of UEs including in-cell UEs and one or more nearby out-of-cell UEs; and
   transmitting data to the in-cell UEs via multi-user beamforming, including the data suppressing interference to the one or more nearby out-of-cell UEs that are part of the plurality of nearby UEs based on the radio-propagation channel coefficients estimates.

2. The method defined in claim 1 wherein suppressing interference to the one or more nearby out-of-cell UEs comprises zero forcing the one or more nearby out-of-cell UEs.

3. The method defined in claim 1 further comprising estimating a channel covariance matrix of a received signal vector based on the received transmissions of uplink pilot signals.

4. The method defined in claim 1 further comprising determining pilot code indices of UEs in the subset of UEs.

5. The method defined in claim 4 further comprising determining a subset of pilot code indices of the one or more nearby out-of-cell UEs in the subset of UEs, the base station being operable to use the subset of pilot code indices to select the one or more nearby out-of-cell UEs that are part of the plurality of nearby UEs for which the base station suppresses interference.

6. The method defined in claim 1 further comprising allocating a set of pilot signals to each of its scheduled users for pilot transmission.

7. The method in claim 1, wherein the allocated pilot signals comprise a unique pilot code allocated to each scheduled user in the vicinity of at least one base station.

8. The method defined in claim 1 further comprising allocating a set of radio resource elements in each slot for uplink pilot transmission.

9. The method in claim 3, wherein estimating channels of the subset of UEs in the plurality of nearby UEs comprises estimating strength of multipath components in the radio channel propagation between each scheduled user in the vicinity of the base station.

10. A non-transitory computer readable storage medium that stores instructions, which when executed on a base station, causes the base station to perform a method comprising:
    receiving transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot;

estimating large-scale radio-channel propagation strengths of a plurality of nearby UEs to a base station;

estimating radio-propagation channel coefficients between each base-station antenna and each UE in a subset of UEs in the plurality of nearby UEs that have the large-scale radio-channel propagation strengths to the base station that are stronger than those UEs in the plurality of nearby UEs not part of the subset, the subset of UEs including in-cell UEs and one or more nearby out-of-cell UEs; and transmitting data to the in-cell UEs via multi-user beamforming, including the data suppressing interference to the one or more nearby out-of-cell UEs that are part of the plurality of nearby UEs based on the radio-propagation channel coefficients estimates.

11. The non-transitory computer readable storage medium defined in claim 10 wherein suppressing interference to the one or more nearby out-of-cell UEs comprises zero-forcing the one or more nearby out-of-cell UEs.

12. The non-transitory computer readable storage medium defined in claim 10 further comprising estimating a channel covariance matrix of a received signal vector based on the received transmissions of uplink pilot signals at the base station.

13. The non-transitory computer readable storage medium defined in claim 10 further comprising determining pilot code indices of UEs in the subset of UEs.

14. The non-transitory computer readable storage medium defined in claim 13 farther comprising determining a subset of pilot code indices of the one or more nearby out-of-cell UEs in the subset of UEs, the base station being operable to use the subset of pilot code indices to select the one or more nearby out-of-cell UEs that are part of the plurality of nearby UEs for which the base station suppresses interference.

15. The non-transitory computer readable storage medium defined in claim 10 further comprising allocating, by the base station, a unique pilot code allocated to each scheduled user in the vicinity of at least one base-station.

16. A base station comprising:
a plurality of antennas operable to receive transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot;
transmitter and receiver logic coupled to the plurality of antennas;
a processor coupled to the transmitter and receiver logic and operable to
estimate large-scale radio-channel propagation strengths of a plurality of nearby UEs to a base station,
estimate radio-propagation channel coefficients between each base-station antenna and each UE in a subset of UEs in the plurality of nearby UEs that have the large-scale radio-channel propagation strengths to the base station that are stronger than those UEs in the plurality of nearby UEs not part of the subset, the subset of UEs including in-cell UEs and one or more nearby out-of-cell UEs, and
transmit data to the in-cell UEs via multi-user beamforming, including the data suppressing interference to the one or more nearby out-of-cell UEs that are part of the plurality of nearby UEs based on the radio-propagation channel coefficients estimates.

17. The base station defined in claim 16 wherein the base station is operable to suppress interference to the one or more nearby out-of-cell UEs by zero-forcing the one or more nearby out-of-cell UEs.

18. The base station defined in claim 16 wherein the processor is operable to estimate a channel covariance matrix of a received signal vector based on the received transmissions of uplink pilot signals at the base station.

19. The base station defined in claim 16 wherein the processor is operable to determine pilot code indices of UEs in the subset of UEs.

20. The base station defined in claim 19 wherein the processor is operable to determine a subset of pilot code indices of the one or more nearby out-of-cell UEs in the subset of UEs, the base station being operable to use the subset of pilot code indices to select the one or more nearby out-of-cell UEs that are part of the plurality of nearby UEs for which the base station suppresses interference.

21. The base station defined in claim 16 wherein the processor is operable to assign a unique pilot code allocated to each scheduled user in the vicinity of at least one base station.

22. A wireless communication system comprising:
a base station in a cell; and
a plurality of UEs, a first group of the plurality of UEs being in cell with respect to the base station and a second group of the plurality of UEs being out-of-cell with respect to the base station,
wherein the base station is operable to: detect pilots transmitted by nearby out-of-cell UEs, learn channels of the nearby out-of-cell UEs, and suppress interference to one or more of the nearby out-of-cell UEs, wherein the base station comprises:
a plurality of antennas operable to receive transmissions of uplink pilot signals made in each slot, by a number of UEs, over the radio resource elements in slots that are allocated for uplink pilot transmission, wherein the number of UEs in the vicinity of at least one base station exceeds the number of radio resource elements that have been allocated for uplink pilot transmission in the slot;
transmitter and receiver logic coupled to the plurality of antennas; and
a processor coupled to the transmitter and receiver logic and operable to:
estimate large-scale channel gains of a plurality of nearby UEs to the base station,
estimate channels of a subset of UEs in the plurality of nearby UEs that have the large-scale channel gains that are stronger than those UEs in the plurality of nearby UEs not part of the subset, the subset of UEs including in-cell UEs and one or more nearby out-of-cell UEs and
transmit data to the in-cell UEs via multi-user beamforming, including the data suppressing interference to the one or more nearby out-of-cell UEs that are part of the plurality of nearby UEs based on the channels estimates.

23. The system defined in claim 22 wherein the base station suppresses interference by zero forcing the interference to at least one nearby out-of-cell UE.

24. The system defined in claim 22 wherein the base station comprises a memory to store UE pilot codes of out-of-cell UEs and is operable to use the out-of-cell UE pilot codes to identify the nearby out-of-cell UEs.

* * * * *